US006888614B2

(12) United States Patent
Yokoyama

(10) Patent No.: US 6,888,614 B2
(45) Date of Patent: May 3, 2005

(54) IMAGE FORMING APPARATUS

(75) Inventor: Tomoyasu Yokoyama, Hachioji (JP)

(73) Assignee: Konica Minolta Holdings, Inc. (JP)

( * ) Notice: Subject to any disclaimer, the term of this patent is extended or adjusted under 35 U.S.C. 154(b) by 81 days.

(21) Appl. No.: 10/684,308

(22) Filed: Oct. 13, 2003

(65) Prior Publication Data

US 2004/0080728 A1 Apr. 29, 2004

(30) Foreign Application Priority Data

Oct. 29, 2002 (JP) ......................................... 2002-313700

(51) Int. Cl.[7] ........................ G03B 27/52; G03B 27/00; G03G 15/00
(52) U.S. Cl. .......................... 355/40; 355/407; 399/124
(58) Field of Search .................... 355/27, 40, 405–407; 399/21, 124; 271/301

(56) References Cited

U.S. PATENT DOCUMENTS

| 5,486,898 | A | | 1/1996 | Fujii et al. |
| 5,502,545 | A | * | 3/1996 | Tsuruoka ...................... 399/21 |
| 5,909,607 | A | * | 6/1999 | Kikuchi et al. ............. 399/124 |
| 5,974,290 | A | * | 10/1999 | Inoue .......................... 399/124 |
| 6,213,456 | B1 | | 4/2001 | Hirano et al. |
| 6,236,450 | B1 | * | 5/2001 | Ogura ......................... 355/407 |
| 6,262,756 | B1 | | 7/2001 | Kashino et al. |
| 2002/0039133 | A1 | | 4/2002 | Fukushima et al. |

FOREIGN PATENT DOCUMENTS

JP 406297813 * 10/1994

OTHER PUBLICATIONS

European Search Report for Application No. 03023046.0–2217–, dated Mar. 29, 2004.

* cited by examiner

Primary Examiner—Henry Hung Nguyen
(74) Attorney, Agent, or Firm—Cantor Colburn LLP

(57) ABSTRACT

An image forming apparatus capable of reducing time and effort of fixing the jammed film and capable of reducing waste of films not jammed when fixing the jammed film. The apparatus has: a film feeding section including a containing tray capable of containing photosensitive films and a shielding shutter to shield light into the containing tray; a plurality of processing sections to perform processing to a photosensitive film; a conveying mechanism to convey the photosensitive film along a predetermined conveying path leading continuously through the processing sections; a collecting section capable of collecting the photosensitive film on the conveying path; and a control section to control the conveying mechanism so as to convey photosensitive films in a jammed processing section and a processing section upstream of the jammed processing section to the collecting section when the photosensitive film is jammed on the conveying path.

6 Claims, 4 Drawing Sheets

IMAGE FORMING APPARATUS

BACKGROUND OF THE INVENTION

1. Field of the Invention

The invention relates to an image forming apparatus to form an image on a photosensitive film on which a latent image is formed when irradiated with light.

2. Description of Related Art

A laser imager that forms a latent image on a photosensitive film on the basis of image information by scanning the photosensitive film with laser beam and makes the latent image on the photosensitive film visible by heat processing to the photosensitive film, is known. The laser imager is preferably used for outputting a visible image of diagnostic part of an object to be examined by a medical image radiographing apparatus on the photosensitive film, the medical image radiographing apparatus such as an X-ray radiographing apparatus, a MRI (Magnetic Resonance Imaging), a CT (Computed Tomography) or the like.

The above-described laser imager forms a diagnostic image on the photosensitive film on the basis of the image information with conveying the photosensitive film which is a recording medium along a conveying path in order. A recording apparatus such as various types of printers, various types of copy machines or the like has a structure to record an image on a recording medium with conveying the recording medium along a conveying path, like the laser imager. In an image forming apparatus including the laser imager, at least a recording medium is jammed by a characteristic, damage, a fold or the like, of the recording medium.

The jammed recording medium is a common problem to recording apparatuses to convey recording mediums, and it is difficult that the recording apparatuses avoid the problem. In case where the recording medium is jammed, the recording apparatus avoids a further inconvenient problem caused by the jammed recording medium, by continuously conveying a recording medium capable of being conveyed continuously to the outside of the apparatus, or by conveying back the jammed recording medium to a feeding section without conveying the recording medium in a conveying direction continuously (for example, with reference to Japanese Patent Application Publication (Unexamined) No. Tokukai-hei 6-297813 (first and second embodiments)).

However, in case technique disclosed in Japanese Patent Application Publication (Unexamined) No. Tokukai-hei 6-297813 (first and second embodiments) is applied to the laser imager, if the jammed photosensitive film is conveyed back to the feeding section, there is possibility that a shielding shutter of the feeding section is opened because the photosensitive film is not conveyed back to the feeding section completely. In the case, if a little light is irradiated to photosensitive films contained in the feeding section, the photosensitive films on which images are not recorded can be exposed and wasted.

Further, because the image recording apparatus disclosed in Japanese Patent Application Publication (Unexamined) No. Tokukai-hei 6-297813 (first and second embodiments) has a simple conveying path for the recording medium, even if the recording medium is jammed in the conveying path, the image recording apparatus can deal with the jammed recording medium relatively easily. However, in case wherein the conveying path is complicated, once the recording medium is jammed, it is required to spend time on specifying a jammed part or removing the jammed recording medium. Specially, when a plurality of sheets of recording mediums are conveyed along a relatively long conveying path at the same time, it is distinguished to spend the time.

SUMMARY OF THE INVENTION

An object of the present invention is to provide an image forming apparatus capable of reducing time and effort of fixing the jammed film and capable of reducing waste of films not jammed when fixing the jammed film.

In accordance with the present invention, an image forming apparatus comprises: a film feeding section comprising a containing tray capable of containing a plurality of sheets of photosensitive films and a shielding shutter capable of opening and closing to shield light into the containing tray; a plurality of processing sections to perform processing to a photosensitive film fed from the containing tray; a conveying mechanism to convey the photosensitive film fed from the film feeding section along a predetermined conveying path leading continuously through the plurality of processing sections; a collecting section provided at the plurality of processing sections, capable of collecting the photosensitive film on the predetermined conveying path; and a control section to control the conveying mechanism so as to convey photosensitive films in a jammed processing section in the plurality of processing sections and a processing section upstream of the jammed processing section with respect to a conveying direction of the photosensitive film in the plurality of processing sections to the collecting section when the photosensitive film is jammed on the predetermined conveying path in the plurality of processing sections.

Preferably, in the apparatus of the present invention, the control section controls the conveying mechanism so as to continuously convey a photosensitive film in a processing section downstream of the jammed processing section with respect to the conveying direction of the photosensitive film in the plurality of processing sections when the photosensitive film is jammed on the predetermined conveying path.

According to the image forming apparatus of the present invention, because the conveying path leads through a plurality of processing sections, the photosensitive film conveyed by the conveying mechanism passes through the plurality of processing sections in order. In case wherein images are formed on a plurality of sheets of photosensitive films one after another at high speed, the plurality of sheets of photosensitive films are at predetermined intervals on the conveying path, and are conveyed along the conveying path at the same time. In the case, when the photosensitive film is jammed, the jammed photosensitive film and photosensitive films on the conveying path are at any processing section in the plurality of processing sections.

In the case, according to the present invention, the photosensitive film at a processing section downstream of the jammed processing section with respect to the conveying direction of the photosensitive film is conveyed continuously, and the photosensitive films at the jammed processing section and a processing section upstream of the jammed processing section with respect to the conveying direction of the photosensitive film are conveyed to the collecting section. That is, the photosensitive film which can be conveyed continuously is conveyed normally, and the photosensitive film which cannot be conveyed continuously is collected to the collecting section. Consequently, because the photosensitive film which cannot be conveyed continuously is collected to the collecting section, it is possible to save trouble in specifying a jammed portion, and to remove the jammed photosensitive film easily. As a result, it is possible to save trouble in dealing with the jammed photosensitive film.

Preferably, the apparatus of the present invention further comprises a sensor to detect a photosensitive film on the predetermined conveying path; wherein the control section determines whether the photosensitive film is jammed on the predetermined conveying path or not based on the result detected by the sensor, and controls the conveying mechanism based on the result determined.

Preferably, in the apparatus of the present invention, the shielding shutter is controlled by the control section so as to open and close.

Preferably, in the apparatus of the present invention, the control section closes the shielding shutter when determining that the photosensitive film is jammed on the predetermined conveying path.

Preferably, in the apparatus of the present invention, the control section controls the conveying mechanism so as to convey the photosensitive films in the jammed processing section in the plurality of processing sections and the processing section upstream of the jammed processing section with respect to the conveying direction of the photosensitive film in the plurality of processing sections to the collecting section with closing the shielding shutter when determining that the photosensitive film is jammed on the predetermined conveying path.

According to the apparatus, in case wherein the photosensitive film is jammed, the shielding shutter is controlled so as to be closed. At the time, the photosensitive films contained in the containing tray is shielded by the shielding shutter. Consequently, in case the photosensitive film is jammed, it is possible to deal with the jammed photosensitive film without wasting at least the photosensitive films contained in the containing tray.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

EMBODIMENTS OF THE INVENTION

Hereinafter, an embodiment of an image forming apparatus of the present invention will be explained with reference to figures. The embodiment shows an example of a case the image forming apparatus of the present invention is applied to a laser imager. A definition of the present invention is not limited to the present embodiment and the figures.

Figure 1:
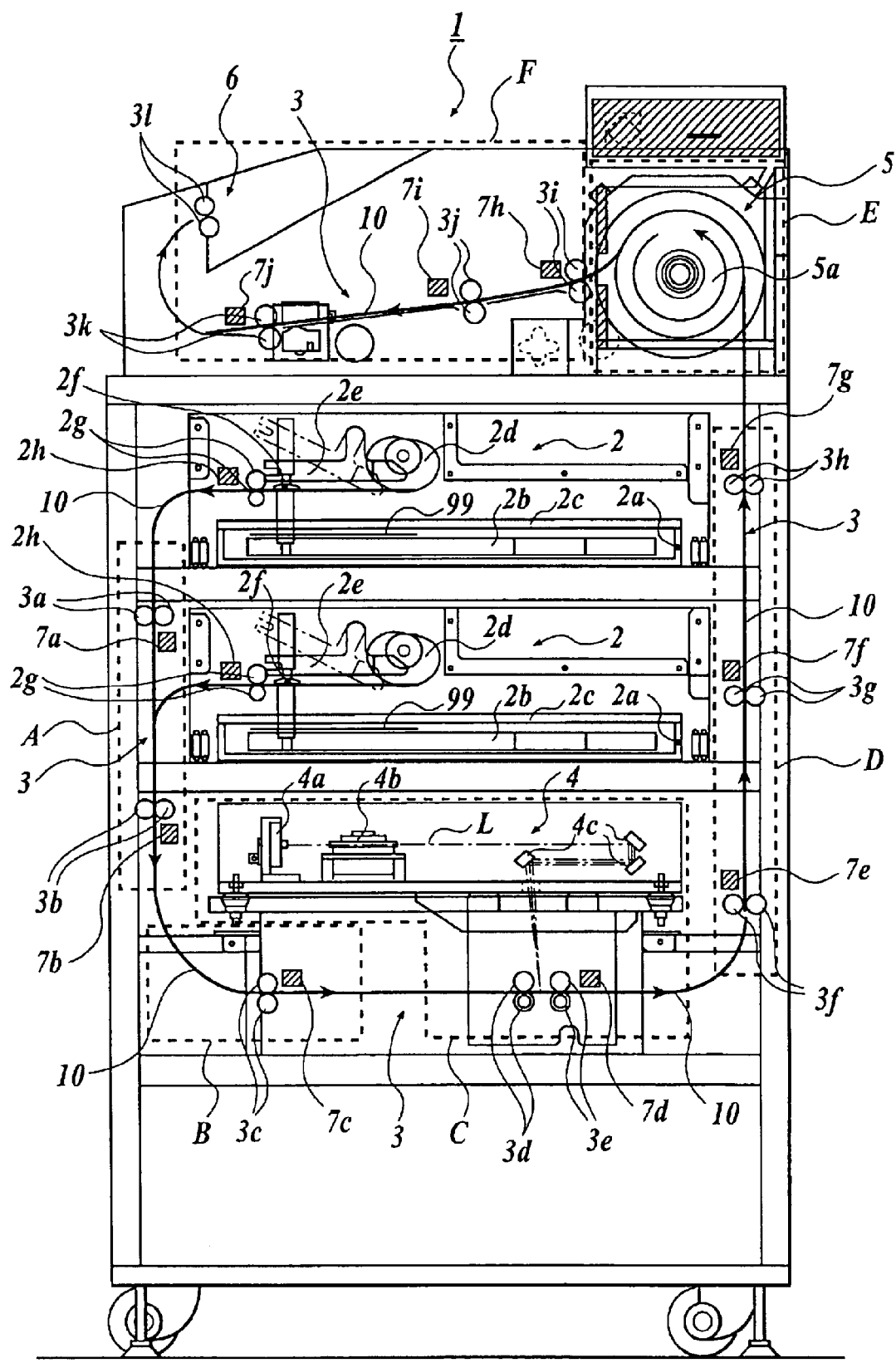
FIG. 1 is a sectional side view showing a laser imager 1.

FIG. 1 is a sectional side view of a laser imager 1. As shown in FIG. 1, the laser imager 1 mainly comprises two film feeding sections 2 and 2 to feed a plurality of sheets of photosensitive films 99, 99, . . . to a conveying path 10 one by one, a conveying mechanism to convey the photosensitive film 99 in a predetermined conveying direction (shown by an arrow in FIG. 1), a light scanning section 4 to irradiate a laser beam L to the photosensitive film 99 and forming a latent image on the photosensitive film 99, a thermal development section 5 to perform heat processing to the photosensitive film 99 on which the latent image is formed, and developing the photosensitive film 99, and a control unit 8 (shown in FIG. 2) to control operation of each section.

A tray 2a formed in a box-like shape wherein an upper surface is opened is provided at each film feeding section 2. A containing tray 2b formed in a box-like shape wherein an upper surface is opened is provided at an inside of the tray 2a. A plurality of sheets of photosensitive films 99, 99, . . . are stacked up and contained in the containing tray 2b. A shielding shutter 2c covers an upper portion or an upper part of the tray 2a and the containing tray 2b.

The shielding shutter 2c is capable of opening and closing by a driving section (which is not shown in figures). FIG. 1 shows a state wherein the shielding shutter 2c is closed. In the state, the shielding shutter 2c prevents light from inserting in the containing tray 2b and each photosensitive film 99 contained in the containing tray 2b from being exposed.

A pick up member 2e capable of going up and down with rotation of a cam 2d is provided at each film feeding section 2. A suction cup 2f connected to a suction pump (which is not shown in figures) through a pipe (which is not shown in figures) is provided at the pick up member 2e. A pair of feeding rollers 2g are provided near the suction cup 2f of each film feeding section 2. A sensor 2h to detect a photosensitive film 99 is provided near the feeding rollers 2g. A well-known photo sensor comprising a light emitting element and a light receiving element or the like is used as the sensor 2h.

A plurality of pairs of conveying rollers 3a to 3l and a guide member (which is not shown in figures) disposed along the conveying path 10 continuously or discontinuously are provided at the conveying mechanism 3.

The conveying rollers 3a to 3l are provided along the conveying path 10. Each pair of the conveying rollers 3a to 3l can send (convey) the photosensitive film 99 in the direction shown by the arrows in FIG. 1 (the conveying direction of the photosensitive film 99) by rotating in a predetermined direction with holding the photosensitive film 99 between the rollers. Each pair of the conveying rollers 3a to 3l can rotate in an opposite direction to the direction to send the photosensitive film 99 in the direction shown by the arrows in FIG. 1. Like the case of sending the photosensitive film 99 in the direction shown by the arrows in FIG. 1, each pair of the conveying rollers 3a to 3l can send back the photosensitive film 99 in the opposite direction to the direction shown by the arrows in FIG. 1 with holding the photosensitive film 99 between the rollers.

In the following explanation, in order to explain the conveying of the photosensitive film 99 easily, in case each pair of the conveying rollers 3a to 3l "rotates in a right direction (right rotation)", the photosensitive film 99 is conveyed in the direction shown by the arrows in FIG. 1. Further, in case each pair of the conveying rollers 3a to 3l "rotates in an opposite direction (opposite rotation)", the photosensitive film 99 is conveyed in the opposite direction to the direction shown by the arrows in FIG. 1.

The light scanning section 4 comprises a laser beam source 4a to emit a laser beam L, a polygon mirror 4b to polarize the laser beam L, and three reflecting mirrors 4c, 4c and 4c to reflect the laser beam L in predetermined directions.

A heating drum 5a capable of being controlled so as to be heated is provided at the thermal development section 5. The heating drum 5a is driven to be rotated counterclockwise in FIG. 1, when controlled so as to be heated.

In the laser imager 1 having the above-described structure, each film feeding section 2 is provided at a start position of the conveying path 10. The light scanning section 4 and the thermal development section 5 are provided along the conveying path 10 in order. The photosensitive film 99 held by each film feeding section 2 is conveyed from the film feeding section 2 at the start position of the conveying path 10 along the conveying path 10 by the conveying mechanism 3, processed as follows by the light scanning section 4 and the thermal development 5 while being conveyed, and finally ejected to an ejection tray 6 at a final position of the conveying path 10.

In the case, the photosensitive film 99 passes through processing parts including a feeding part A, a first conveying part B, a latent image forming part C, a second conveying part D, a thermal developing part E and an ejecting part F in order. The "feeding part A" is a part to perform a process of feeding the photosensitive film 99 fed from each film feeding section 2 to the side of the first conveying part B. The "first conveying part B" is a part to perform a process of conveying the photosensitive film 99 which have passed through the feeding section A to the side of the latent image forming section C. The "latent image forming section C" is a part to perform a process of forming a predetermined latent image on the photosensitive film 99 by the light scanning section 4. The "second conveying part D" is a part to perform a process of conveying the photosensitive film 99 processed by the latent image forming part C to the side of the thermal developing part E. The "thermal developing part E" is a part to perform a process of developing the photosensitive film 99 by the thermal development section 5. The "ejecting part F" is a part to perform a process of ejecting the developed photosensitive film 99 to the ejection tray 6. The conveying path 10 leads through the feeding part A, the first conveying part B, the latent image forming part C, the second conveying part D, the thermal developing part E and the ejecting part F continuously (shown by a thick line in FIG. 1).

Sensors 7a to 7j to detect a photosensitive film 99 are provided along the conveying path 10 leading through the processing parts A to D and F. More specifically, a sensor 7a is provided near the conveying rollers 3a, and a sensor 7b is provided near the conveying rollers 3b in the feeding part A. A sensor 7c is provided near the conveying rollers 3c in the first conveying part B. A sensor 7d is provided near the conveying rollers 3e in the latent image forming part C. A sensor 7e is provided near the conveying rollers 3f, a sensor 7f is provided near the conveying rollers 3g, and a sensor 7g is provided near the conveying rollers 3h in the second conveying part D. A sensor 7h is provided near the conveying rollers 3i, a sensor 7i is provided near the conveying rollers 3j, and a sensor 7j is provided near the conveying rollers 3k in the ejecting part F.

The sensors 7a to 7j are provided at a downstream side of the corresponding near conveying rollers 3a to 3k (other than the conveying rollers 3d) with respect to the direction shown by the arrows in FIG. 1 (the conveying direction of the photosensitive film 99). A well-known photo sensor comprising a light emitting element and a light receiving element or the like is used as the sensors 7a to 7j.

When the photosensitive film 99 is processed by heat in a state the latent image is formed on the photosensitive film 99 by irradiating with light, the latent image is visualized. According to the embodiment, a substrate made of PET resin (Poly Ethylene Terephthalate resin) and coated with an emulsion including a silver halide particle, organic acid silver salt, a image toning agent, a reducing agent and so on, is used as the photosensitive film 99.

Figure 3:
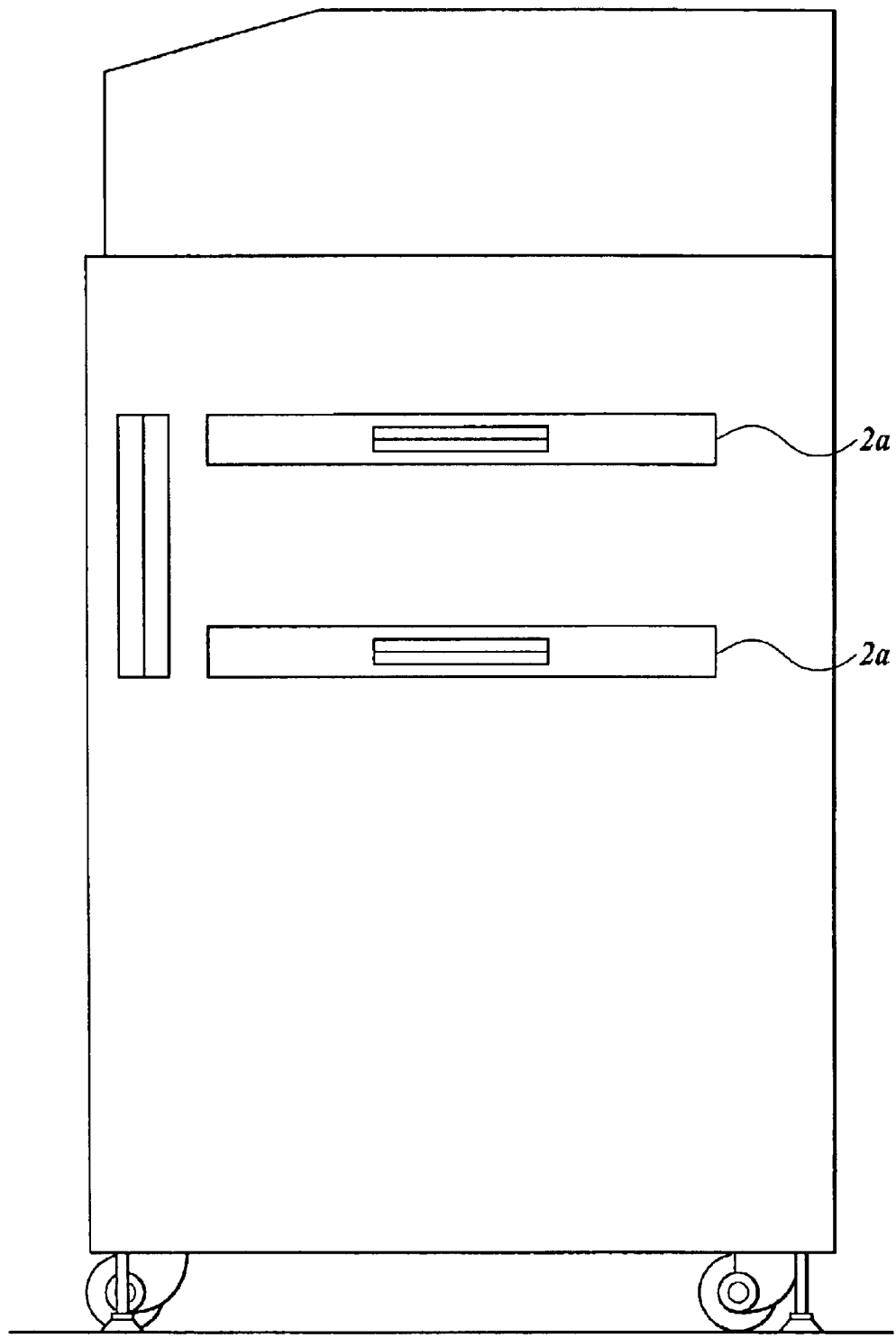
FIG. 3 is a side view showing the laser imager 1 in a state a side door is closed.
Figure 4:
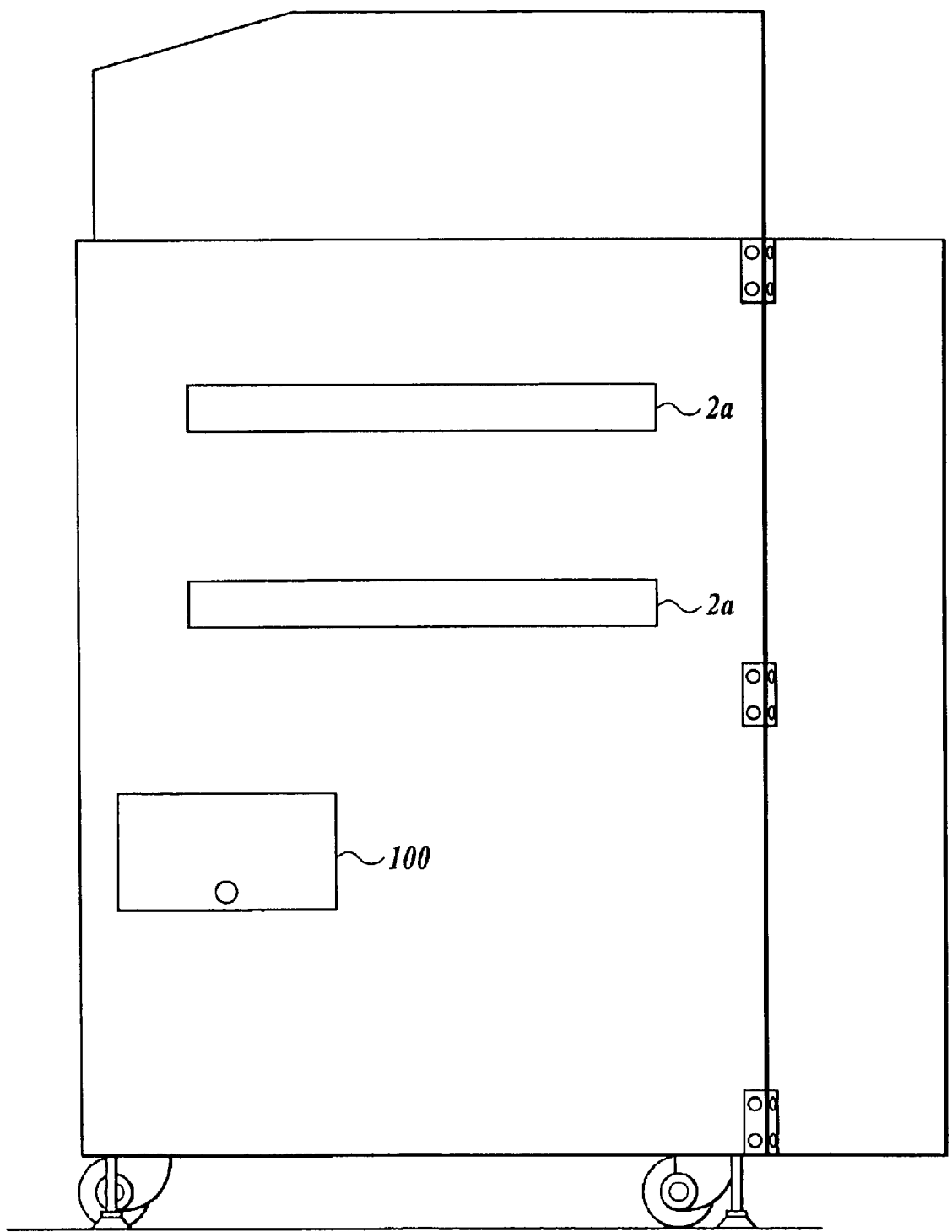
FIG. 4 is a side view showing the laser imager 1 in a state the side door is opened.

The laser imager 1 having the above-described structure comprises a door 100 (shown in FIG. 4) capable of being opened and closed at a part covering a front of the first conveying part B. When a user opens a side door (shown in FIG. 3) of the laser imager 1, and then opens the door 100, the user can remove the photosensitive film 99 in the first conveying part B.

Next, the circuit structure of the laser imager 1 will be explained schematically.

Figure 2:
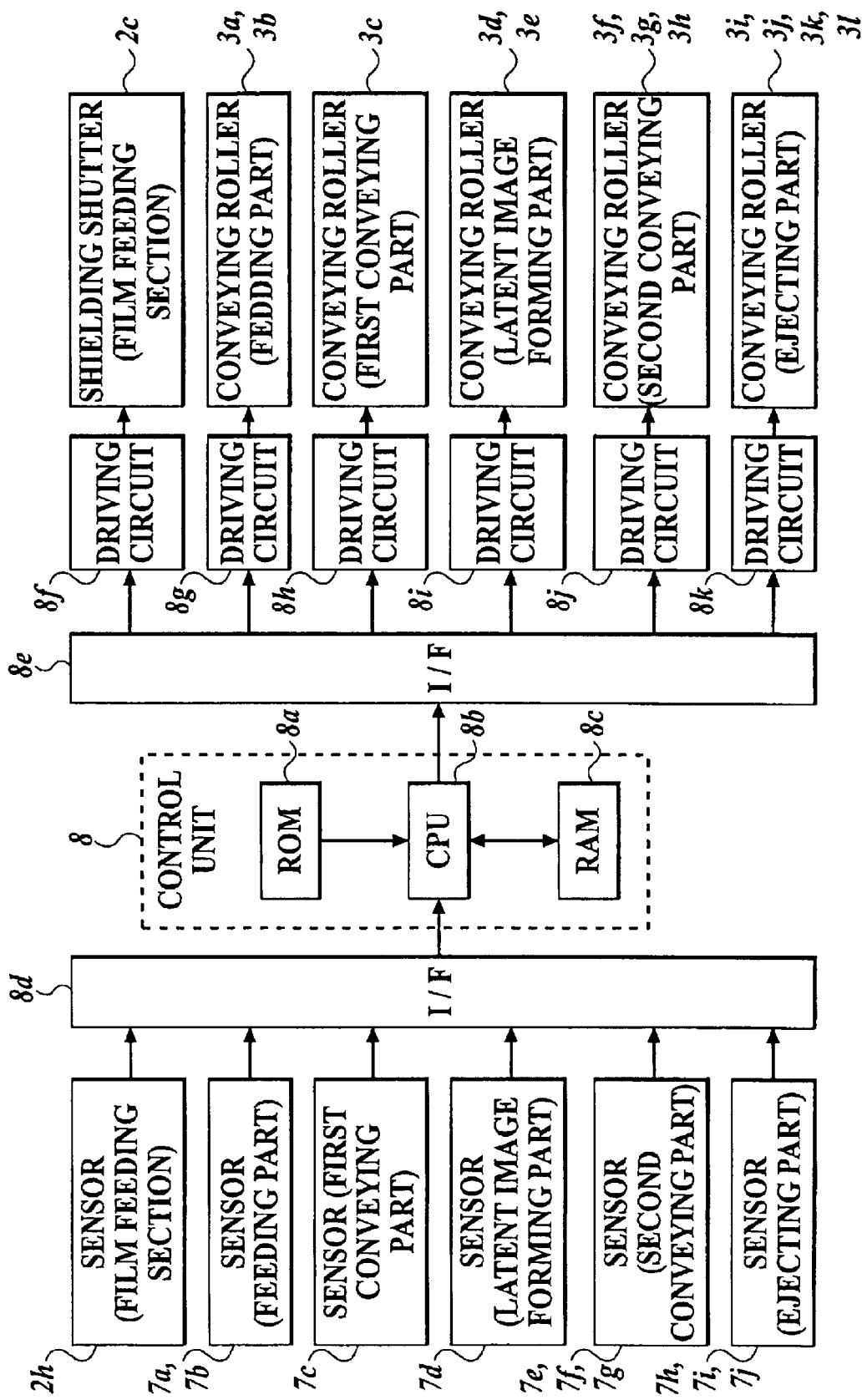
FIG. 2 is a block diagram schematically showing a circuit structure of the laser imager 1.

FIG. 2 is a block diagram schematically showing the circuit structures of the control unit 8 and the sections controlled by the control unit 8. As shown in FIG. 8, the control unit 8 comprises a ROM 8a to store a control program of previously controlling operation of each section of the laser imager 1, data used for the control program or the like, a CPU 8b to perform various types of processing based on the control program, and a RAM 8c to store data or the like calculated by the CPU 8b on the basis of the data and the control program read out of the ROM 8a.

Specially, the sensor 2h for each film feeding section 2 and the sensors 7a to 7j for the processing parts A to D are connected to the CPU 8b through an interface (I/F) 8d. Further, driving circuits 8f to 8k to drive the shielding shutter 2c of each film feeding section 2 and the conveying rollers 3a to 3l of the processing parts A to D are connected to the CPU 8b through an I/F 8e.

Next, the operation of the laser imager 1 will be explained.

First, when a plurality of sheets of photosensitive films 99, 99, . . . are contained in the containing tray 2b of each film feeding section 2, the shielding shutter 2c is closed. When the laser imager 1 starts performing image forming processing, the CPU 8b of the control unit 8 outputs a control signal to open the shielding shutter 2c of any one of the film feeding sections 2 to the driving circuit 8f. Therefore, when a driving section of the shielding shutter 2c operates, the shielding shutter 2c is moved to predetermined distance right-hand side from the closed state (the state shown in FIG. 1), and stopped. That is, the shielding shutter 2c is changed from the closed state to the opened state. At the time, a left side part of the shielding shutter 2c is opened and forms an opening part.

Then, when the cam 2d and the suction pump operate, the pick up member 2e goes down, and the suction cup 2f passes through the opening part and sucks the photosensitive film 99. Thereafter, when the pick up member 2e goes up in a state the suction cup 2f sucks the photosensitive film 99, one sheet of the plurality of sheets of photosensitive films 99, 99, . . . contained in the containing tray 2b is picked up. When the picked-up photosensitive film 99 is held between the feeding rollers 2g, and at least one feeding roller 2g of a pair of feeding rollers 2g and 2g rotates, one sheet of photosensitive film 99 contained in the containing tray 2b passes through the feeding rollers 2g. Therefore, a top portion of the photosensitive film 99 toward the conveying part 10 is fed, and then an end portion of the photosensitive film 99 is fed on the conveying path 10.

In the case, the sensor 2g outputs the detection signal indicating that there is the photosensitive film 99 to the CPU 8b of the control unit 8 after the top portion of the photosensitive film 99 starts passing through the position corresponding to the sensor 2g just before the end portion of the photosensitive film 99 finishes passing the position corresponding to the sensor 2g. When the end portion of the photosensitive film 99 finishes passing the position corresponding to the sensor 2g, the sensor 2g outputs the detection signal indicating that there is not any photosensitive film 99 to the CPU 8b of the control unit 8. At the time, when the CPU 8b of the control unit 8 outputs the control signal to close the shielding shutter 2c to the driving circuit 8f, the shielding shutter 2c is changed from the opened state to the former state (closed state).

Then, the photosensitive film 99 is fed to the feeding part A, passes through the processing parts B to F along the conveying path 10 in order, and is ejected to the ejection tray 6.

More specifically, in the feeding part A, when the conveying rollers 3a and 3b rotate in the right directions, the photosensitive film 99 is conveyed to the side of the first conveying part B. In the first conveying part B, the conveying rollers 3c rotate in the right directions, the photosensitive film 99 is conveyed to the side of the latent image forming part C.

In the latent image forming part C, the conveying rollers 3d and 3e rotate in the right directions, the photosensitive film 99 is conveyed to the side of the second conveying part D. At the time, the laser beam source 4a emits a laser beam L, and the polygon mirror 4b is rotated. At the time, because the laser beam L is irradiated to the photosensitive film 99 through the polygon mirror 4b and three reflecting mirrors 4c, 4c and 4c, a silver halide particle included in an emulsion of the photosensitive film 99 is exposed. Therefore, a predetermined latent image is formed on the photosensitive film 99.

In the second conveying part D, when the conveying rollers 3f to 3h rotate in the right directions, the photosensitive films 99 are conveyed to the side of the thermal developing part E.

In the thermal developing part E, the heating drum 5a rotates counterclockwise shown in FIG. 1 when controlled so as to be heated. The photosensitive film 99 is rotated in a state of being contacted with the heating drum 5a as the heating drum 5a rotates, and processed (developed) when heated with heat of the heating drum 5a. At the time, in the photosensitive film 99, silver ions (Ag+) are released from organic acid silver salt, and the organic acid silver salt which have released silver ions form a complex compound with the image toning agent. After that, the silver ions diffuse, and a latent image is formed by a chemical reaction through the action of the reducing agent with the silver halide particles which have sensed the light made as nuclei. Thereby, a predetermined silver image is formed through a chemical reaction.

In the ejecting part F, when the conveying rollers 3i to 3l rotate in the right directions, the photosensitive film 99 is ejected to the ejection tray 6.

As described above, the photosensitive film 99 contained in the containing tray 2b passes through the processing parts A to F in order. Then, a predetermined image is formed on the photosensitive film 99 ejected to the ejection tray 6.

Herein, because the laser imager 1 according to the present embodiment detects whether there is the photosensitive film 99 or not by the sensors 7a to 7j of the processing parts A to D and F, it is possible to feed a plurality of sheets of photosensitive films 99, 99, . . . on the conveying path 10 at predetermined intervals, and to convey the photosensitive films 99 throughout the plurality of processing parts A to F at the same time. In the case, each photosensitive film 99 can be jammed by a characteristic, damage, a fold or the like, of the photosensitive film 99 in each of the processing parts A to F.

Hereinafter, in case the photosensitive film 99 is jammed in the second conveying part D as an example, the operation of the laser imager 1 after the photosensitive film 99 is jammed will be explained.

When any of the sensors 7e to 7g in the second conveying part D does not output the detection signal indicating that there is the photosensitive film 99 to the CPU 8b of the control unit 8 even if predetermined time passes, the CPU 8b determines that the photosensitive film 99 is jammed in the second conveying part D. Then, the CPU 8b outputs the control signal to stop the right rotation of the conveying rollers 3a to 3h in the processing parts A to D to each of the driving circuits 8g to 8j. Therefore, when the conveying rollers 3a to 3h in the processing parts A to D stops rotating in the right directions, the photosensitive films 99 stops at the positions in the processing parts A to D.

Then, the CPU 8b of the control unit 8 outputs the control signal to again rotate the conveying rollers 3a and 3b of the feeding part A in the right directions to the driving circuit 8g. Thereby, when the conveying rollers 3a and 3b of the feeding part A starts rotating in the right directions again, the photosensitive film 99 which stays at the feeding part A is conveyed to the first conveying part B, and stops at the first conveying part B. The CPU 8b of the control unit 8 outputs the control signal to rotate the conveying rollers 3d to 3h of the latent image forming part C and the second conveying part D in the opposite directions to each of the driving circuits 8i and 8j. Thereby, when the conveying rollers 3d to 3h of the latent image forming part C and the second conveying part D rotate in the opposite directions, the photosensitive film 99 which stays at the latent image forming part C or the second conveying part D is conveyed back to the first conveying part B, and stops at the first conveying part B.

While performing the above-described operation, the CPU 8b of the control unit 8 continuously outputs the control signal to rotate the conveying rollers 3i to 3l of the ejecting part F normally to the driving circuit 8k. Thereby, because the conveying rollers 3i to 3l of the ejecting part F rotate in the right directions continuously, the photosensitive film 99 is conveyed continuously.

Then, in case the sensor 7j of the ejecting part F does not output the detection signal indicating that there is the photosensitive film 99 to the CPU 8b of the control unit 8 even when predetermined time passes, the CPU 8b determines that the photosensitive film 99 capable of being conveyed is ejected to the ejection tray 6, and performs processing of informing a user of the jammed photosensitive film 99. Therefore, the user can recognize that the photosensitive film 99 is jammed. Accordingly, the user can open the door 100 (shown in FIG. 4) provided at the front of the laser imager 1, and remove the photosensitive films 99 (including the photosensitive film 99 by which the photosensitive film 99 has been jammed in the second conveying part D) which stay at the first conveying part B, at a time.

In case there is the photosensitive film 99 in the thermal developing part E, the processing in the thermal developing part E is performed normally, and a predetermined image is formed on the photosensitive film 99 ejected to the ejection tray 6. The CPU 8b of the control unit 8 outputs the control signal to close the shielding shutter 2c to the driving circuit 8f continuously after determining that the photosensitive film 99 is jammed in the second conveying part D and until finishing dealing with the jammed photosensitive film 99, and controls the shielding shutter 2c so as to keep closing the shielding shutter 2c.

When the photosensitive film 99 is jammed in the second conveying part D, the laser imager 1 as described controls the photosensitive film 99 in the thermal developing part E or the ejecting part F downstream of the second conveying part D with respect to the conveying direction of the photosensitive film 99 so as to convey the photosensitive film 99 normally. Accordingly, the photosensitive film 99 in the thermal developing section E or the ejecting section F cannot be wasted.

Further, in the case, the photosensitive film 99 in the second conveying part D or the processing part A, B or C upstream of the second conveying part D with respect to the conveying direction of the photosensitive film 99 is controlled so as to be conveyed to the first conveying part B. That is, the fist conveying part B functions as the collecting section of the present invention.

Consequently, as described above, in case wherein the photosensitive film 99 is jammed in the second conveying part D, because the photosensitive film 99 in the second conveying part D or the processing part A, B or C upstream of the second conveying part D with respect to the conveying direction of the photosensitive film 99 is collected to one position of the first conveying part B, it is possible to save trouble in specifying the jammed position, and it is possible that a user easily removes the photosensitive film 99 by opening one door 100. As a result, it is possible to save trouble in dealing with the jammed photosensitive film 99. Further, because the laser imager 1 can collect the jammed photosensitive film 99 and photosensitive films 99 upstream of the jammed photosensitive film 99 with respect to the conveying direction of the photosensitive film 99 to the specific first conveying part B, it is unnecessary to provide many opening and closing sections to remove the photosensitive film 99, such as the door 100 or the like.

Further, when the laser imager 1 deals with the jammed photosensitive film 99 as described above, the laser imager 1 controls the shielding shutter 2c so as to close the shielding shutter 2c. Accordingly, there is no possibility that each photosensitive film 99 on the conveying path 10 is conveyed back to the film feeding section 2, and the shielding shutter 2c is opened. As a result, in the case, because the photosensitive films 99 contained in each film feeding section 2 is shielded, it is possible to deal with the jammed photosensitive film 99 without wasting at least the photosensitive films 99 contained in the containing tray 2b.

Although the present invention has been explained according to the above-described embodiment, it should also be understood that the present invention is not limited to the embodiment and various chanted and modifications may be made to the invention without departing from the gist thereof.

For example, according to the embodiment, the operation of the laser imager 1 has been explained in the case that photographing film 99 is jammed in the second conveying part D as an example. However, in case the photographing film 99 is jammed in the thermal development part E, the conveying mechanism 3 may be controlled as follows.

In the ejecting part F, when the conveying rollers 3i to 3l rotate in the right directions, the photosensitive film 99 in the ejecting part F is conveyed normally, and the conveyed photosensitive film 99 is conveyed to the ejection tray 6. In the parts A to D, while the conveying rollers 3c in the first conveying part B is kept stopped, the conveying rollers 3a and 3b in the feeding part A rotate in the right directions, and the conveying rollers 3d to 3h in the latent image forming part C and the second conveying part D rotate in the opposite directions. Thereby, the photosensitive film 99 in each of the processing parts A to D is conveyed (collected) to the first conveying part B.

Further, in case the photosensitive film 99 is jammed in any processing part of the processing parts A to F and the photosensitive films 99 in the jammed processing part and the processing parts upstream of the jammed part with respect to the conveying direction of the photosensitive film 99 are conveyed (collected) to the first conveying part B, the conveying rollers in the processing parts from which the photosensitive films 99 are collected may be operated manually, and the photosensitive film 99 may be conveyed and collected to the first conveying part B.

According to the embodiment, the photosensitive film 99 can be sent back by rotating the conveying rollers 3d to 3h in the latent image forming part C and the second conveying part D in the opposite directions. That is based on circumstances wherein even if the photosensitive film 99 is jammed by a fold of the top portion of the photosensitive film 99 in the conveying direction, there are extremely many cases where the end portion of the photosensitive film 99 in the conveying direction is normal. However, the photosensitive film 99 cannot be always sent back by rotating the conveying rollers 3d to 3h in the latent image forming part C and the second conveying part D in the opposite directions. Therefore, the opening and closing section such as the door or the like may be provided at a portion covering each of the processing parts A to D besides the portion covering the front of the first conveying part B. In the case, a user can remove the photosensitive film 99 which cannot be collected to the first conveying part B from a suitable portion.

Further, the present embodiment shows an embodiment wherein all processing parts A to F along the conveying path are "a plurality of processing sections" of the present invention, as a preferable embodiment. However, in the present invention, it is unnecessary that all processing parts along the conveying path correspond to "a plurality of processing sections" of the present invention. One part of the processing parts along the conveying path may be "a plurality of processing sections" of the present invention. For example, only the first conveying part B, the latent image forming part C, the second conveying part D and the thermal developing part E may correspond to "a plurality of processing sections". In case where the photosensitive film 99 is jammed in any processing part of the processing parts B to E, the photosensitive film 99 in the processing part downstream of the jammed processing part may be conveyed continuously, and the photosensitive film 99 in the jammed processing part or the processing part upstream of the jammed processing part may be conveyed and collected to the collecting section.

According to the present invention, it is possible to save trouble in dealing with the jammed photosensitive film. Further, it is possible to deal with the jammed photosensitive film without wasting at least photosensitive films contained the containing tray.

The entire disclosure of Japanese Patent Application No. Tokugan 2002-313700 filed on Oct. 29, 2002 including specification, claims, drawings and summary are incorportated herein by reference in its entirety.

What is claimed is:

1. An image forming apparatus comprising:
   a film feeding section comprising a containing tray capable of containing a plurality of sheets of photosensitive films and a shielding shutter capable of opening and closing to shield light into the containing tray;

a plurality of processing sections to perform processing to a photosensitive film fed from the containing tray;

a conveying mechanism to convey the photosensitive film fed from the film feeding section along a predetermined conveying path leading continuously through the plurality of processing sections;

a collecting section provided at the plurality of processing sections, capable of collecting the photosensitive film on the predetermined conveying path; and a control section to control the conveying mechanism so as to convey photosensitive films in a jammed processing section in the plurality of processing sections and a processing section upstream of the jammed processing section with respect to a conveying direction of the photosensitive film in the plurality of processing sections to the collecting section when the photosensitive film is jammed on the predetermined conveying path in the plurality of processing sections.

2. The apparatus of claim 1, wherein the control section controls the conveying mechanism so as to continuously convey a photosensitive film in a processing section downstream of the jammed processing section with respect to the conveying direction of the photosensitive film in the plurality of processing sections when the photosensitive film is jammed on the predetermined conveying path.

3. The apparatus of claim 1, further comprising a sensor to detect a photosensitive film on the predetermined conveying path;

wherein the control section determines whether the photosensitive film is jammed on the predetermined conveying path or not based on the result detected by the sensor, and controls the conveying mechanism based on the result determined.

4. The apparatus of claim 1, wherein the shielding shutter is controlled by the control section so as to open and close.

5. The apparatus of claim 1, wherein the control section closes the shielding shutter when determining that the photosensitive film is jammed on the predetermined conveying path.

6. The apparatus of claim 1, wherein the control section controls the conveying mechanism so as to convey the photosensitve films in the jammed processing section in the plurality of processing sections and the processing section upstream of the jammed processing section with respect to the conveying direction of the photosensitive film in the plurality of processing sections to the collecting section with closing the shielding shutter when determining that the photosensitive film is jammed on the predetermined conveying path.

* * * * *